(12) United States Patent
Katto (10) Patent No.: US 10,487,929 B2
(45) Date of Patent: Nov. 26, 2019

(54) TOROIDAL CONTINUOUSLY VARIABLE TRANSMISSION

(71) Applicant: NSK LTD., Tokyo (JP)

(72) Inventor: Satoshi Katto, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/125,359

(22) PCT Filed: Jan. 21, 2015

(86) PCT No.: PCT/JP2015/051556
§ 371 (c)(1),
(2) Date: Sep. 12, 2016

(87) PCT Pub. No.: WO2015/136990
PCT Pub. Date: Sep. 17, 2015

(65) Prior Publication Data
US 2017/0097073 A1    Apr. 6, 2017

(30) Foreign Application Priority Data

Mar. 11, 2014  (JP) .................................. 2014-047454

(51) Int. Cl.
*F16H 37/02* (2006.01)
*F16H 15/38* (2006.01)

(52) U.S. Cl.
CPC ........... *F16H 37/021* (2013.01); *F16H 15/38* (2013.01)

(58) Field of Classification Search
CPC .................. F16H 37/021; F16H 15/38; F16H 2055/0866; F16H 55/088; B21K 1/30;
(Continued)

(56) References Cited

U.S. PATENT DOCUMENTS 6,074,324 A * 6/2000 Ishikawa ................. F16H 15/38
148/233
6,656,080 B2 * 12/2003 Watanabe ............... F16C 19/46
476/42

(Continued)

FOREIGN PATENT DOCUMENTS

JP    2003-156112 A    5/2003
JP    2005-240895 A    9/2005
(Continued)

OTHER PUBLICATIONS

Search Report dated Apr. 7, 2015, issued by the International Searching Authority in counterpart International Application No. PCT/JP2015/051556 (PCT/ISA/210).
(Continued)

*Primary Examiner* — William C Joyce
*Assistant Examiner* — Bobby Rushing, Jr.
(74) *Attorney, Agent, or Firm* — Sughrue Mion, PLLC (57) ABSTRACT

There is provided a toroidal continuously variable transmission including an input side disk and an output side disk which are provided to be concentric with each other and rotatable in a state where inner side surfaces thereof face each other, and a power roller which is interposed between the input side disk and the output side disk. At least one of the input side disk and the output side disk is configured as a gear disk which has teeth on an outer circumferential portion thereof. Each tooth on the outer circumferential portion of the gear disk is provided with a protruding portion which outwardly protrudes in a radial direction of the gear disk and has a width narrower than a width of the teeth in an axial direction of the gear disk. A tip end surface of the protruding portion serves as a processing reference of the gear disk.

1 Claim, 9 Drawing Sheets

(58) Field of Classification Search
CPC ......... Y10T 29/49462; Y10T 29/49467; Y10T 29/49472; Y10T 29/49476
USPC ............ 74/437, 458; 29/893, 893.3, 893.35; 476/40, 42, 46, 72
See application file for complete search history.

(56) References Cited

U.S. PATENT DOCUMENTS

| | | | | |
|---|---|---|---|---|
| 7,000,444 | B2* | 2/2006 | Roeske | B21J 13/08 29/893.34 |
| 7,118,462 | B2* | 10/2006 | Hirata | B24B 19/06 451/406 |
| 7,188,420 | B2* | 3/2007 | Fisher | B23B 31/025 279/136 |
| 7,628,091 | B2* | 12/2009 | Mizuno | B23F 15/00 74/438 |
| 8,480,532 | B2* | 7/2013 | Biermann | F16H 48/10 475/252 |
| 9,427,816 | B2* | 8/2016 | Milletari | B23B 31/025 |
| 9,506,550 | B2* | 11/2016 | Dickinger | F16H 55/18 |
| 2003/0096672 | A1* | 5/2003 | Imanishi | F16H 15/38 476/42 |
| 2005/0197227 | A1 | 9/2005 | Imanishi et al. | |
| 2005/0215184 | A1 | 9/2005 | Hirata | |
| 2010/0081530 | A1* | 4/2010 | Crump | B21K 1/30 474/152 |

FOREIGN PATENT DOCUMENTS

| | | |
|---|---|---|
| JP | 2005-279805 A | 10/2005 |
| JP | 2007-327558 A | 12/2007 |
| JP | 2012-112425 A | 6/2012 |
| JP | 2012-197911 A | 10/2012 |
| JP | 2013-117237 A | 6/2013 |
| WO | 2010/084793 A1 | 7/2010 |

OTHER PUBLICATIONS

Written Opinion dated Apr. 7, 2015, issued by the International Searching Authority in counterpart International Application No. PCT/JP2015/051556 (PCT/ISA/237).

Communication dated Aug. 14, 2017, issued by the European Patent Office in counterpart European application No. 15761278.9.

* cited by examiner

TOROIDAL CONTINUOUSLY VARIABLE TRANSMISSION

TECHNICAL FIELD

The present invention relates to a toroidal continuously variable transmission which can be used as a transmission of a vehicle or various industrial machines.

BACKGROUND ART

Figure 6:
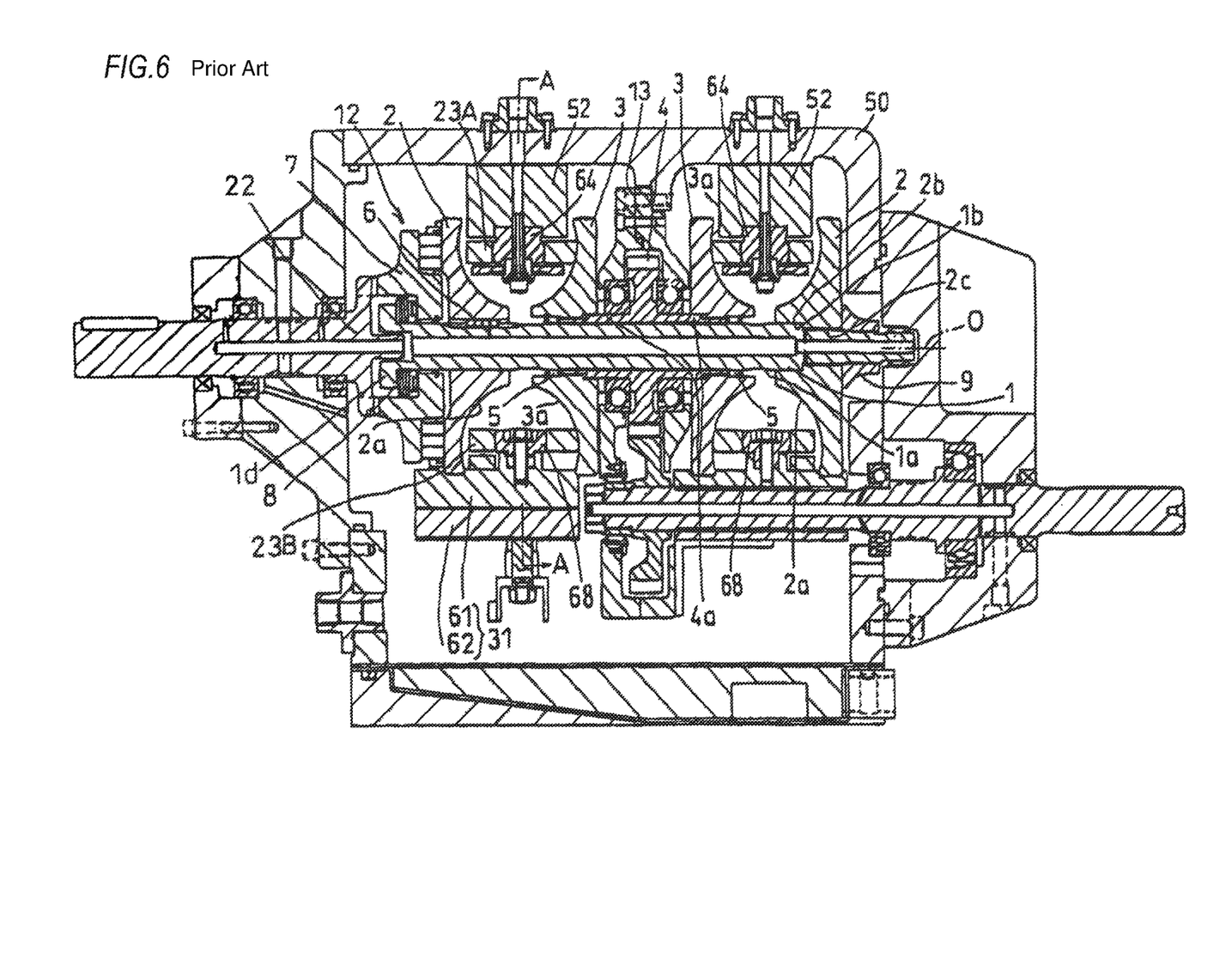
FIG. 6 is a sectional view illustrating an example of a conventional toroidal continuously variable transmission.
Figure 7:
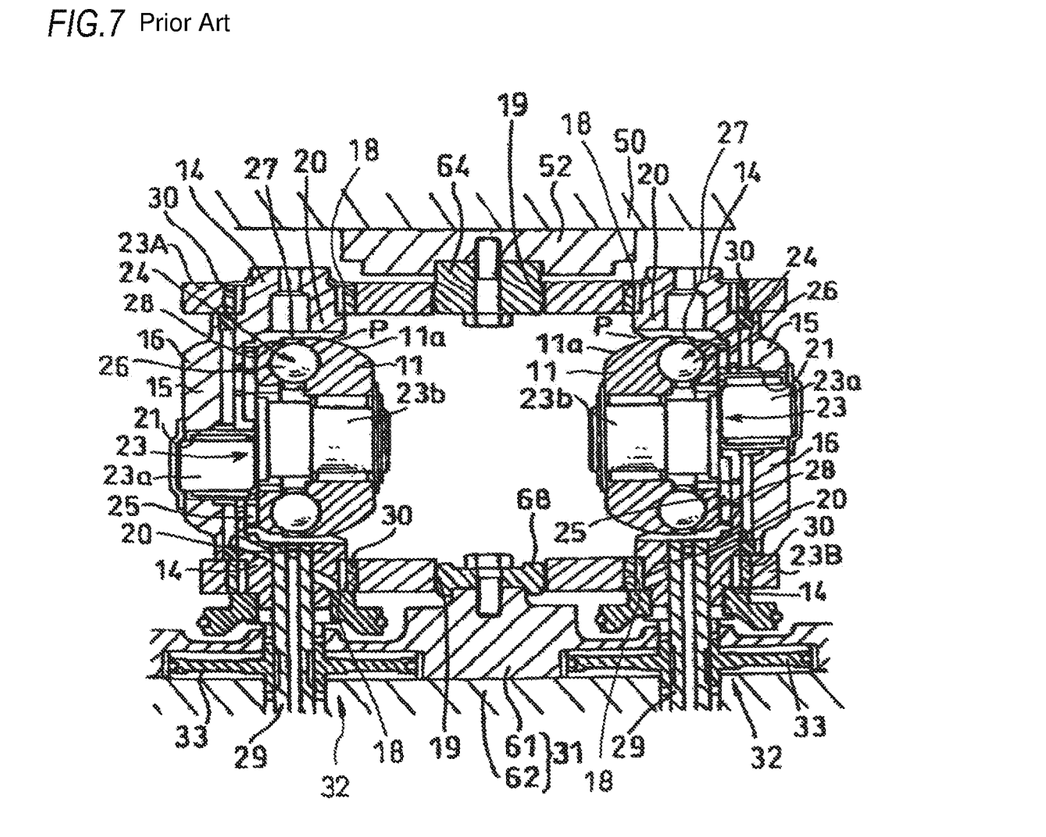
FIG. 7 is a sectional view along line A-A in FIG. 6.

For example, a double cavity type toroidal continuously variable transmission which is used as a vehicle transmission is configured as illustrated in FIGS. 6 and 7. As illustrated in FIG. 6, an input shaft 1 is rotatably supported on an inner side of a casing 50, and two input side disks 2, 2, and two output side disks 3, 3 are provided to an outer circumference of the input shaft 1. An output gear 4 is rotatably supported on the outer circumference of a middle portion of the input shaft 1. The output side disks 3, 3 are connected to cylindrical flange portions 4*a*, 4*a* provided in the center portion of the output gear 4 by spline-coupling.

The input shaft 1 is driven to rotate by a driving shaft 22 via a loading cam type pressing device 12 which is provided between the input side disk 2 and a cam plate (loading cam) 7 which are positioned on the left side in the drawing. The output gear 4 is supported in the casing 50 via a partition wall 13 which is configured by connecting two members, and accordingly, the output gear 4 is prohibited from displacement in an axis O direction while being rotatable around an axis O of the input shaft 1.

The output side disks 3, 3 are rotatably supported around the axis O of the input shaft 1 by needle bearings 5, 5 which are interposed between the output side disks 3, 3 and the input shaft 1. The input side disk 2 on the left side in the drawing is supported by the input shaft 1 via a ball spline 6, the input side disk 2 on the right side in the drawing is spline-coupled to the input shaft 1, and the input side disks 2 rotate together with the input shaft 1. A power roller 11 (refer to FIG. 7) is interposed to be rotatable between inner surfaces (recessed surface: also referred to as a traction surface) 2*a*, 2*a* of the input side disks 2, 2, and inner surfaces (recessed surface: also referred to as a traction surface) 3*a*, 3*a* of the output side disks 3, 3.

On an inner circumferential surface 2*c* of the input side disk 2 which is positioned on the right side in FIG. 6, a step portion 2*b* is provided. A step portion 1*b* provided on an outer circumferential surface 1*a* of the input shaft 1 abuts against the step portion 2*b*, and a back face (right surface of FIG. 6) of the input side disk 2 abuts against a loading nut 9 screwed to a screw portion formed on the outer circumferential surface of the input shaft 1. Accordingly, displacement in the axis O direction with respect to the input shaft 1 of the input side disk 2 is substantially prohibited. A leaf spring 8 is provided between the cam plate 7 and a flange portion 1*d* of the input shaft 1. The leaf spring 8 applies a pressing force (preload) to an abutting portion between the recessed surfaces 2*a*, 2*a*, 3*a*, 3*a* of each of disks 2, 2, 3, 3, and circumferential surfaces 11*a*, 11*a* of the power rollers 11, 11.

FIG. 7 is a sectional view along line A-A of FIG. 6. As illustrated in FIG. 7, the inner side of the casing 50 is provided with one pair of trunnions 15, 15 which swing around one pair of pivots 14, 14 which are provided at a skew position with respect to the input shaft 1. In FIG. 7, the input shaft 1 is omitted in the drawing. Each trunnion 15, 15 has one pair of bent wall portions 20, 20 which are formed while being bent on the inner surface side of a support plate portion 16 at both end portions of the support plate portion 16 in the longitudinal direction (upper-lower direction of FIG. 7). By the bent wall portions 20, 20, a recessed pocket portion P for accommodating the power roller 11 therein is formed in each trunnion 15, 15. Each pivot 14, 14 is provided concentrically on the outer surface of each bent wall portion 20, 20.

A circular hole 21 is formed in the center portion of the support plate portion 16, and a base end portion (first shaft portion) 23*a* of a displacement shaft 23 is supported by the circular hole 21. By swinging each trunnion 15, 15 around each pivot 14, 14, an inclination angle of the displacement shaft 23 supported by the center portion of each trunnion 15, 15 is adjusted. In the surrounding of a tip end portion (second shaft portion) 23*b* of the displacement shaft 23 which protrudes from the inner surface of each trunnion 15, 15, each power roller 11 is rotatably supported, and each power roller 11, 11 is interposed between each input side disk 2, 2 and each output side disk 3, 3. The base end portion 23*a* and the tip end portion 23*b* of each displacement shaft 23, 23 are displaced to each other.

The pivots 14, 14 of each trunnion 15, 15 are supported to be swingable with respect to one pair of yokes 23A, 23B and to be displaceable in the axial direction (upper-lower direction of FIG. 7), and movement of the trunnions 15, 15 in the horizontal direction is regulated by each yoke 23A, 23B. Each yoke 23A, 23B is formed in a rectangular shape by press machining or forge processing of a metal, such as steel. Four circular support holes 18 are provided at four corners of each yoke 23A, 23B, and each pivot 14 provided in both end portions of the trunnion 15 is supported to be swingable via radial needle bearings 30 in the support holes 18. In the center portion of the yokes 23A, 23B in the width direction (left-right direction of FIG. 6), a circular locking hole 19 is provided, and the inner circumferential surface of the locking holes 19 is internally fitted with spherical surface posts 64, 68 as cylindrical surfaces. In other words, the yoke 23A on the upper side is supported to be swingable by the spherical surface post 64 which is supported by the casing 50 via a fixing member 52, and the yoke 23B on the lower side is supported to be swingable by the spherical surface post 68 and an upper cylinder body 61 of a driving cylinder 31 supported by the spherical surface post 68.

In addition, each displacement shaft 23, 23 provided in each trunnion 15, 15 is provided at positions opposite to each other at 180 degrees with respect to the input shaft 1. The direction in which the tip end portion 23*b* of each displacement shaft 23, 23 are displaced to the base end portion 23*a* is the same direction (upper-lower reverse direction in FIG. 7) in the rotational direction of the disks 2, 2 and the disks 3, 3. The displacement direction is the direction which is substantially orthogonal to the installation direction of the input shaft 1. Therefore, each power roller 11, 11 is supported to be slightly displaceable in the longitudinal direction of the input shaft 1. As a result, even in a case where each power roller 11, 11 tends to be displaced in the axial direction of the input shaft 1 due to elastic deformation or the like of each constituent member based on a thrust load generated by the pressing device 12, the displacement is absorbed without applying an excessive force to each constituent member.

Further, between the outer surface of the power roller 11 and the inner surface of the support plate portion 16 of the trunnion 15, a thrust ball bearing (thrust bearing) 24 which is a thrust rolling bearing and a needle roller thrust bearing 25 are provided in an order from the outer surface of the power roller 11. The thrust ball bearing 24 allows each power roller 11 to rotate while supporting the load in the thrust direction applied to each power roller 11. The thrust ball bearing 24 includes a plurality of balls (hereinafter, referred to as a rolling element) 26, 26, a circular cage 27 which rollably holds each ball 26, 26, and a circular outer ring 28. An inner ring raceway of each thrust ball bearing 24 is formed on the outer surface (large end face) of each power roller 11, and an outer ring raceway is formed on the inner surface of each outer ring 28.

The needle roller thrust bearing 25 is interposed between the inner surface of the support plate portion 16 of the trunnion 15 and the outer surface of the outer ring 28. The needle roller thrust bearing 25 allows the power roller 11 and the outer ring 28 to swing around the base end portion 23a of each displacement shaft 23 while supporting the thrust load applied to each outer ring 28 from the power roller 11.

Further, a driving rod (trunnion shaft) 29 is provided in one end portion (lower end portion of FIG. 7) of each trunnion 15, 15, and a driving piston (hydraulic piston) 33 are fixed to the outer circumferential surface of the intermediate portion of each driving rod 29, 29. Each driving piston 33, 33 is oil-tightly fitted into the driving cylinder 31 configured by the upper cylinder body 61 and a lower cylinder body 62. A driving device 32 which displaces each trunnion 15, 15 in the axial direction of the pivots 14, 14 of the trunnions 15, 15 is configured by each driving piston 33, 33 and the driving cylinder 31.

In a case of the toroidal continuously variable transmission configured in this manner, the rotation of the input shaft 1 is transmitted to each input side disk 2, 2 via the pressing device 12. The rotation of the input side disks 2, 2 is transmitted to each output side disk 3, 3 via the pair of power rollers 11, 11, and further, the rotation of each output side disk 3, 3 is taken out of the output gear 4.

When a rotational speed ratio between the input shaft 1 and the output gear 4 is changed, the pair of driving pistons 33, 33 are displaced in directions reverse to each other. According to the displacement of each driving piston 33, 33, the pair of trunnions 15, 15 are displaced in the directions reverse to each other. For example, the power roller 11 on the left side in FIG. 7 is displaced to the lower side in FIG. 7, and the power roller 11 on the right side in FIG. 7 is displaced to the upper side in FIG. 7.

As a result, the orientation of a force in the tangential direction which acts on the abutting portion between the circumferential surfaces 11a, 11a of each power roller 11, 11, and inner surfaces 2a, 2a, 3a, 3a of each input side disk 2, 2 and each output side disks 3, 3 changes. According to the change in the orientation of the force, each trunnion 15, 15 swings (tilts) in directions reverse to each other around the pivots 14, 14 supported by the yokes 23A, 23B.

As a result, an abutting position between the circumferential surfaces 11a, 11a of each power roller 11, 11 and each inner surface 2a, 3a changes, and the rotational speed ratio between the input shaft 1 and the output gear 4 changes. When torque to be transmitted varies between the input shaft 1 and the output gear 4 and an elastic deformation amount of each constituent member changes, each power roller 11, 11 and the outer rings 28, 28 attached to each power roller 11, 11, slightly rotate around the base end portions 23a, 23a of each displacement shaft 23, 23. Since each needle roller thrust bearing 25, 25 is provided between the outer surface of each outer ring 28, 28 and the inner surface of the support plate portion 16 which configures each trunnion 15, 15, the rotation is smoothly performed. Therefore, as described above, the force for changing the inclination angle of each displacement shaft 23, 23 can be small.

Figure 8:
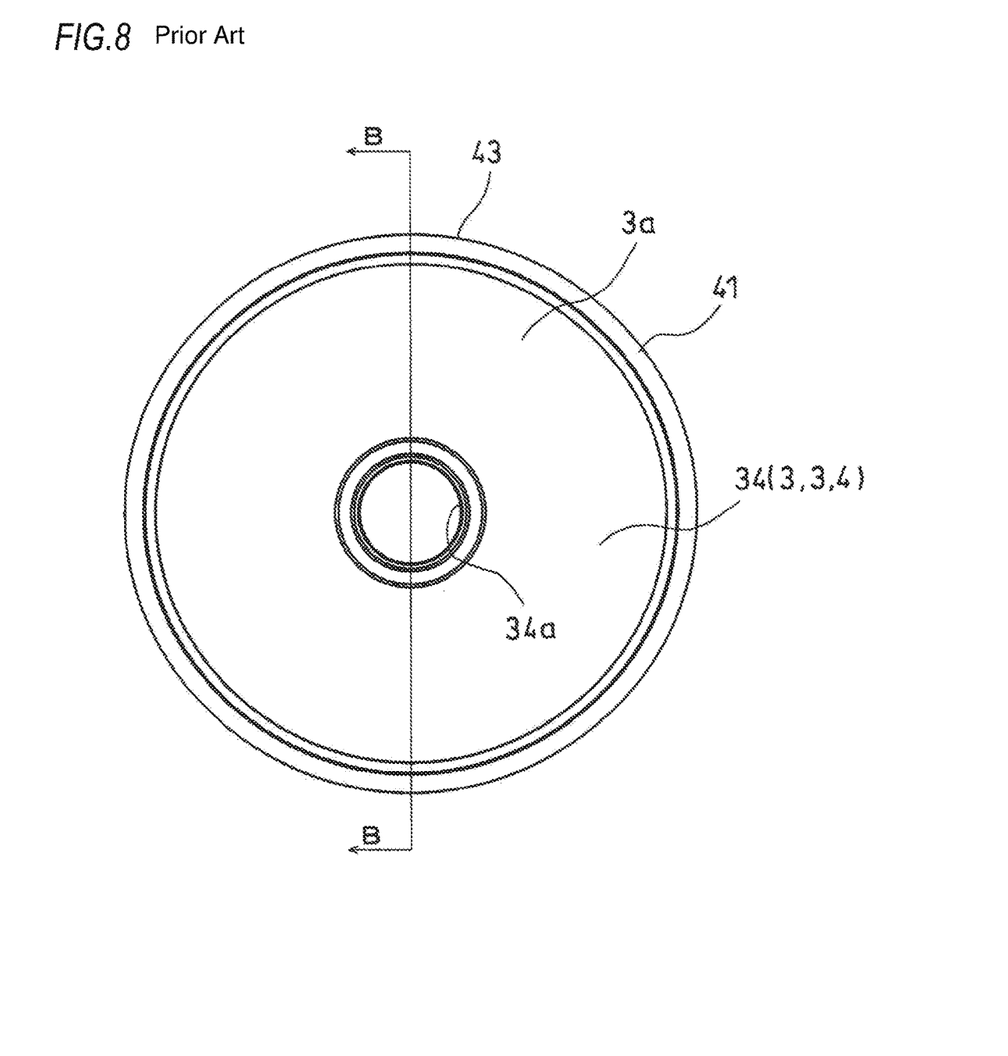
FIG. 8 is schematic side view illustrating an integrated type output side disk of the conventional toroidal continuously variable transmission.
Figure 9:
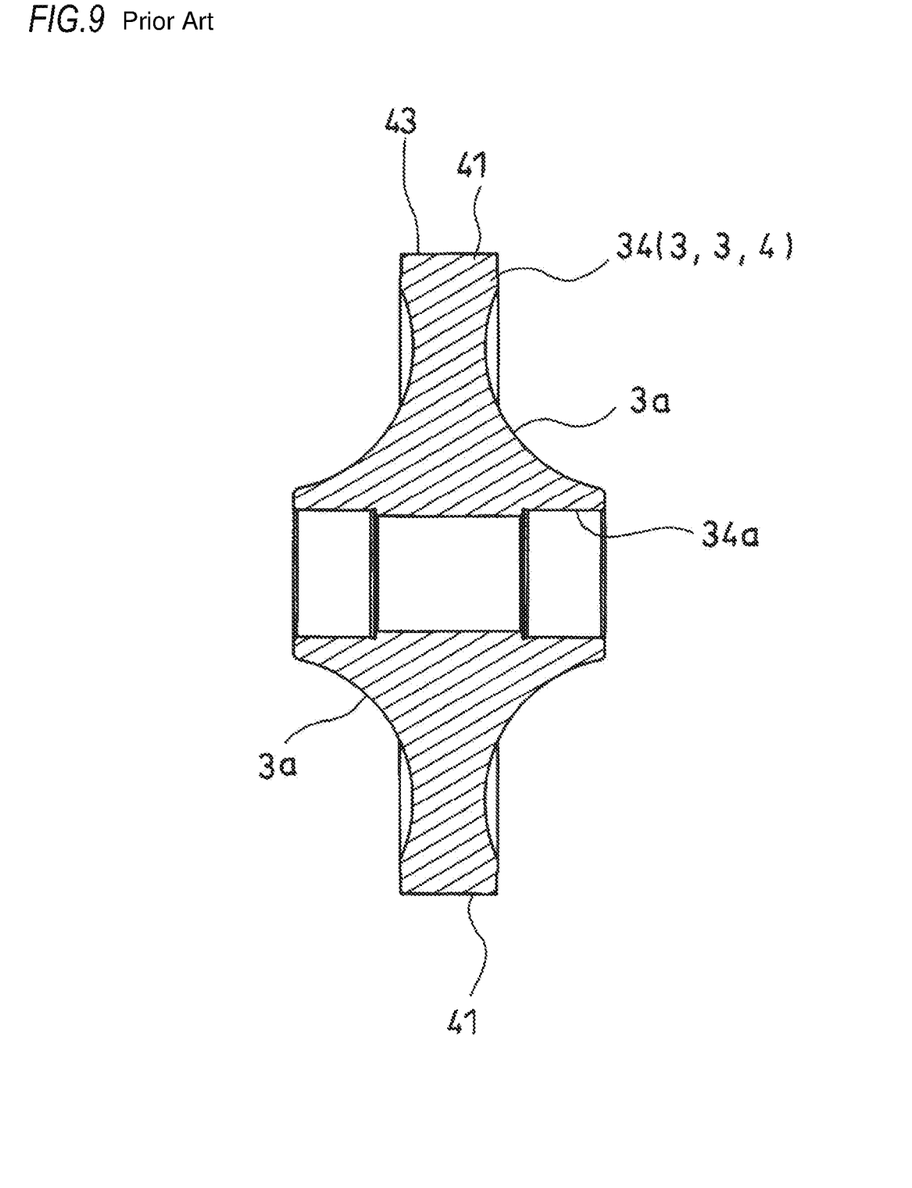
FIG. 9 is a sectional view along line B-B in FIG. 8.

Incidentally, in a double cavity type toroidal continuously variable transmission, as illustrated in FIGS. 8 and 9, an integrated type output side disk 34 is used where a pair of output side disks 3, 3 are integrated with each other while rear surfaces of the pair of output side disks 3, 3 disposed between the pair of input side disks 2, 2 are connected to each other, and the outer circumferential surface of such integrated output side disks 3, 3 is formed with teeth 41 to serve as the output gear 4 (for example, refer to Patent Document 1 and Patent Document 2).

In manufacturing the integrated type output side disk 34, after performing heat treatment together with cutting the gear (processing the gear teeth) on the outer circumferential portion and before performing traction surface processing on the inner surfaces 3a, 3a of the integrated type output side disk 34, a reference plane 43 is formed on the outer circumferential portion of the integrated type output side disk 34 for the traction surface processing and inner diameter grinding of a through hole 34a of the integrated type output side disk 34. The width of the formed reference plane 43 in the axial direction of the integrated type output side disk 34 is same as the width of the teeth 41 formed on the integrated type output side disk 34 in the axial direction of the integrated type output side disk 34. The width of the teeth 41 is same as the width (the thickness in the axial direction of the outer circumferential portion of the integrated type output side disk 34) of the outer circumferential portion of the integrated type output side disk 34.

In FIGS. 8 and 9, the output gear portion of the integrated type output side disk 34 is briefly illustrated, and the output gear portion may be, for example, a helical gear. Four circles illustrating the gear in FIG. 8 are a teeth tip circle, a reference circle, a base circle, and a teeth bottom circle in an order from the outer side, and the reference plane 43 is formed at a portion of the teeth tip circle.

PRIOR ART DOCUMENTS

Patent Documents

Patent Document 1: JP-A-2012-112425
Patent Document 2: JP-A-2013-117237

SUMMARY OF INVENTION

Problems to be Solved

However, by cutting the gear as described above on the outer circumferential portion of the integrated type output side disk 34, the outer circumferential portion of the integrated type output side disk 34 has a non-continuous structure where the portion with teeth and the portion without teeth are repeated. When the reference plane is formed in the outer circumferential portion of the integrated type output side disk 34 having such structure by for example a lathe, the processing would be non-continuous processing. That is, in the lathe processing of the integrated type output side disk 34, a portion of the teeth of the integrated type output side disk sequentially abuts against a tip of a tool bit. Therefore, there is a problem that a tip of the lathe causes a crack. In this case, the number of replacement of the tip increases, and the cost and the working hours increase.

Here, one might consider that if the width of the reference plane is narrower, cracking of the tip could be suppressed. However, if the reference plane is not processed with respect to the entire width of the teeth formed on the outer circumferential portion of the integrated type output side disk, a portion which is not cut when performing the lathe processing protrudes to the outer circumferential side from the cut reference plane. And, if the portion protruding to the outer side is not removed, there is a concern that the reference plane may not function.

The present invention has been made in view of the above-described circumstances, and an object of the present invention is to provide a toroidal continuously variable transmission which can suppress damage to a cutting edge of a processing tool such as a tip attached to a tool bit of a lathe when forming a reference plane for processing, such as traction surface processing, on an outer circumferential surface formed with gear teeth of a gear disk in which a gear and a disk are integrated with each other.

Means for Solving the Problems

In order to achieve the above object, there is provided a toroidal continuously variable transmission including an input side disk and an output side disk which are provided to be concentric with each other and rotatable in a state where inner side surfaces thereof face each other, and a power roller which is interposed between the input side disk and the output side disk, wherein at least one of the input side disk and the output side disk is configured as a gear disk which is integrated with a gear by forming teeth on an outer circumferential portion of the gear disk, and wherein each tooth on the outer circumferential portion of the gear disk is provided with a protruding portion which outwardly protrudes in a radial direction of the gear disk and has a width narrower than a width of the teeth in an axial direction of the gear disk, and a tip end surface of the protruding portion serves as a processing reference of the gear disk.

In the above-described configuration, it is preferable that the width of the protruding portion in the axial direction of the gear disk be equal to or greater than ⅓ and equal to or less than ⅔ of the width of the teeth in the axial direction of the gear disk.

Effects of Invention

According to the toroidal continuously variable transmission of the present invention, each tooth on the outer circumferential portion of the gear disk is provided with a protruding portion which outwardly protrudes in a radial direction of the gear disk and has a width narrower than a width of the teeth in an axial direction of the gear disk, and a tip end surface of the protruding portion serves as a processing reference of the gear disk. Accordingly, in manufacturing the gear disk in which the gear and the disk are integrated with each other, when forming the reference plane for traction surface processing or inner diameter cutting on an outermost circumferential portion of the gear disk, it is possible to suppress damage to a cutting edge of a tool. For example, in a case where the cutting edge is a tip of a tool bit of a lathe, it is possible to reduce the number of replacements of the tip and to achieve reduction of the cost and working hours.

DESCRIPTION OF EMBODIMENTS

Hereinafter, an embodiment of the present invention will be described with reference to the drawings.

Here, characteristics of a toroidal continuously variable transmission of the present embodiment reside in a structure where a tip end surface of a protruding portion (protrusion) provided on an outer circumferential portion of an integrated type output side disk (gear disk) serves as a reference plane for machining, and since other configurations and operations are substantially similar to the above-described conventional configurations and operations, hereinafter, only characteristic portions of the present embodiment will be described, and other portions will be only briefly described by using the same reference numerals as those of FIGS. 8 and 9.

As illustrated in FIGS. 1 to 5, an integrated type output side disk 35 of the toroidal continuously variable transmission of the present embodiment is a gear disk which has a shape where back faces of a pair of output side disks 3, 3 are connected to each other as described above, and which is not only integrated with the pair of output side disks but also further integrated with an output gear 4 by forming teeth 41 on the outer circumferential portion thereof.

Figure 1:
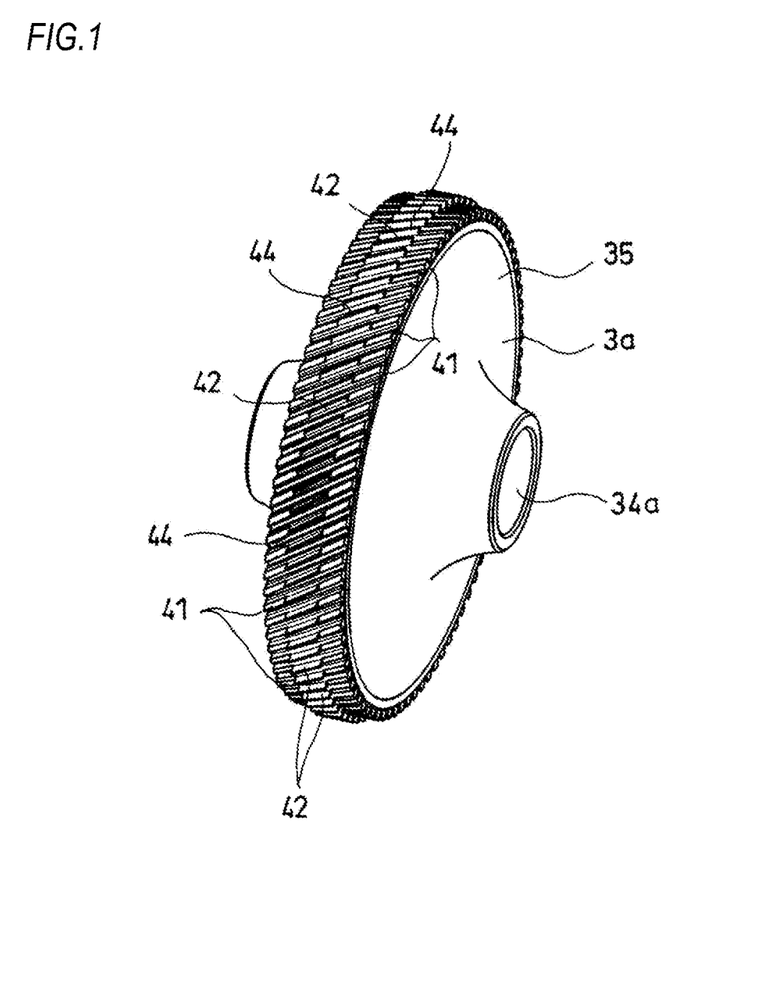
FIG. 1 is a perspective view illustrating an integrated type output side disk (gear disk) of a toroidal continuously variable transmission according to an embodiment of the present invention.
Figure 2:
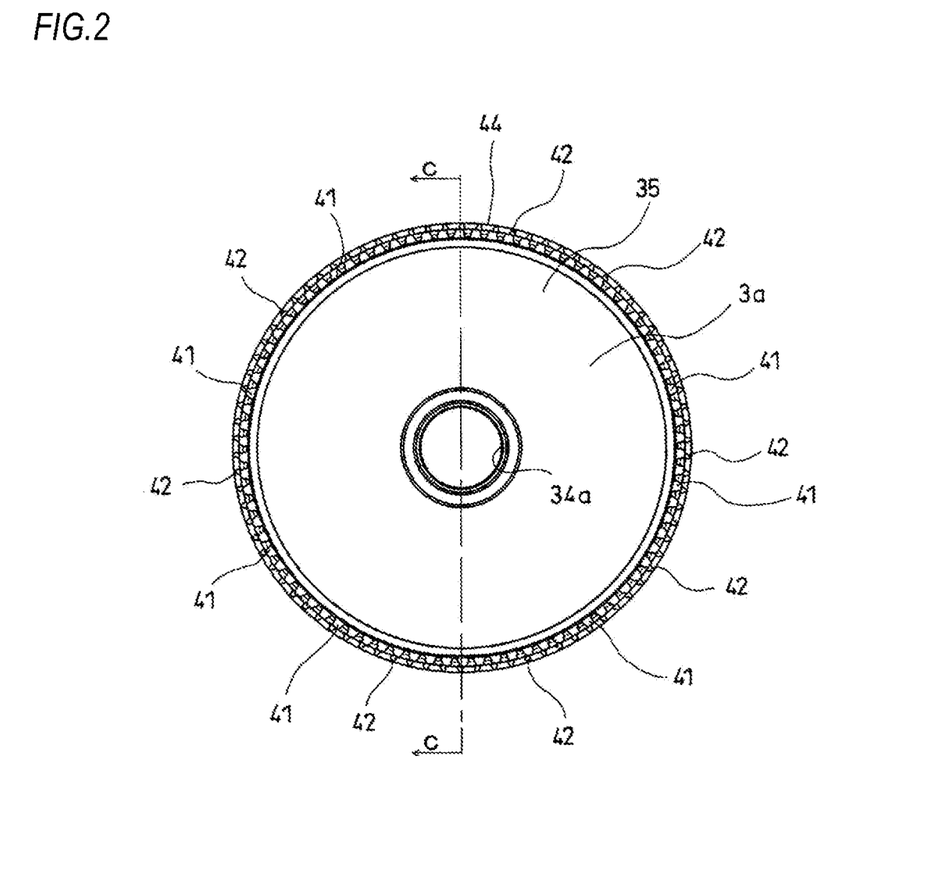
FIG. 2 is a side view illustrating the integrated type output side disk.
Figure 3:
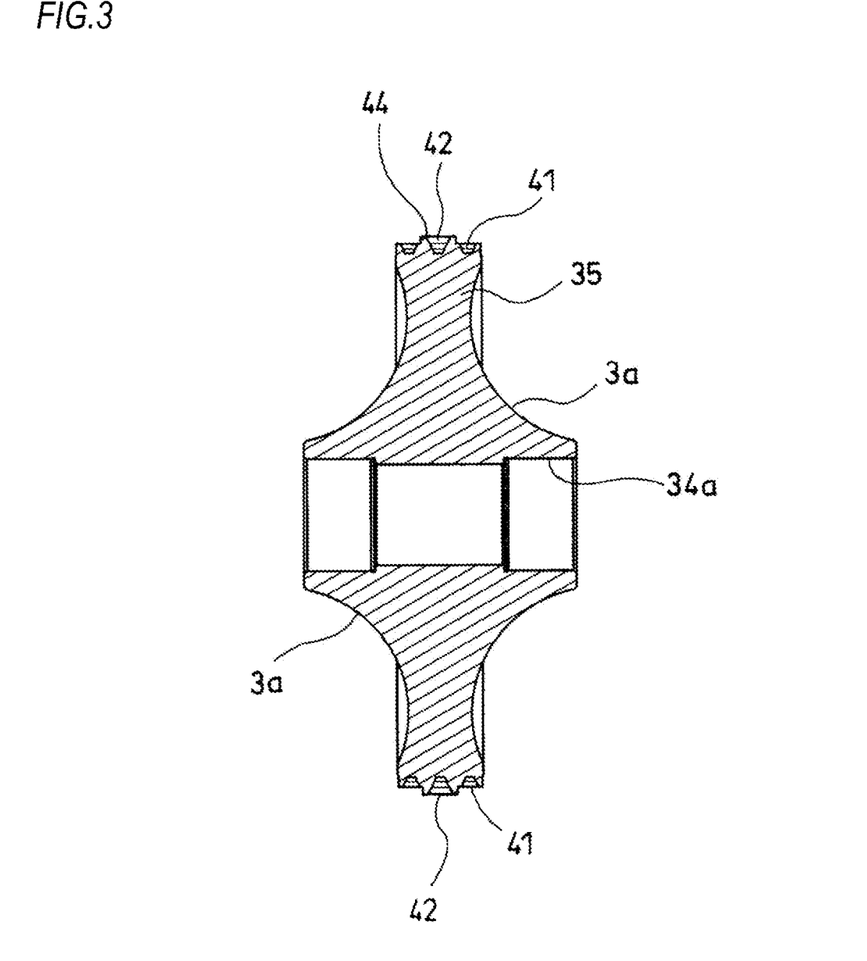
FIG. 3 is a sectional view along line C-C in FIG. 2.
Figure 4:
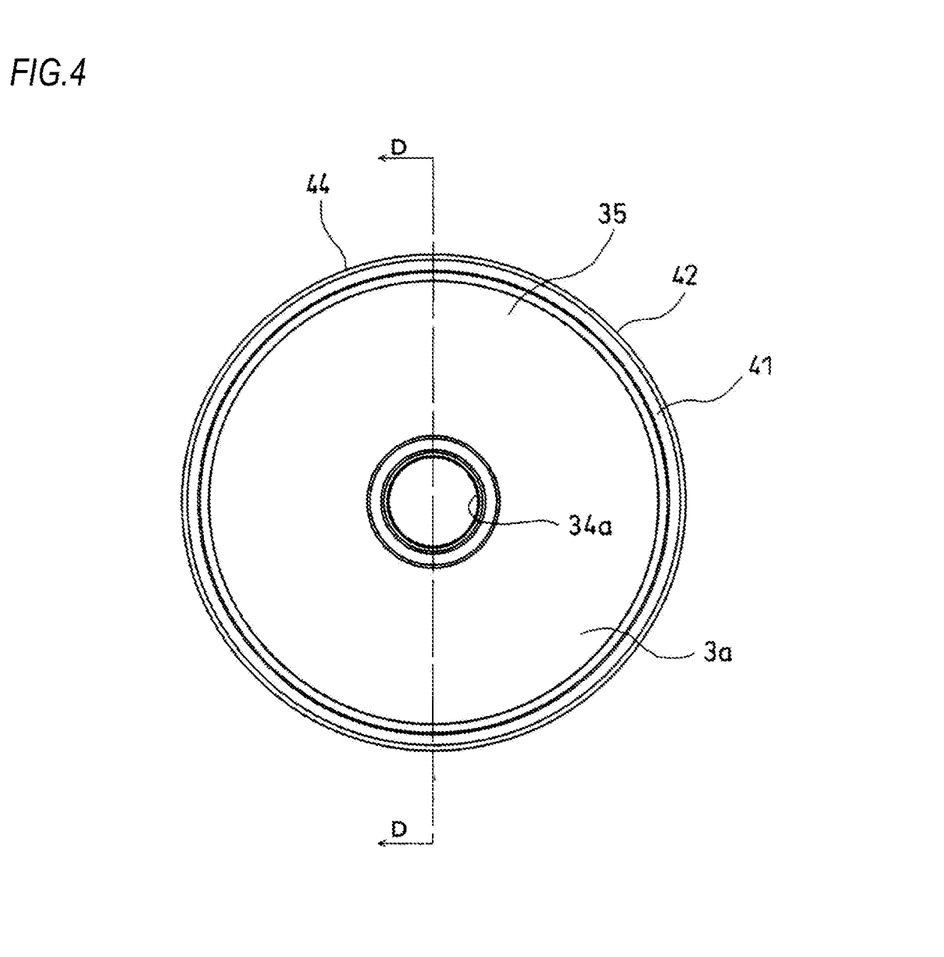
FIG. 4 is a schematic side view illustrating the integrated type output side disk.
Figure 5:
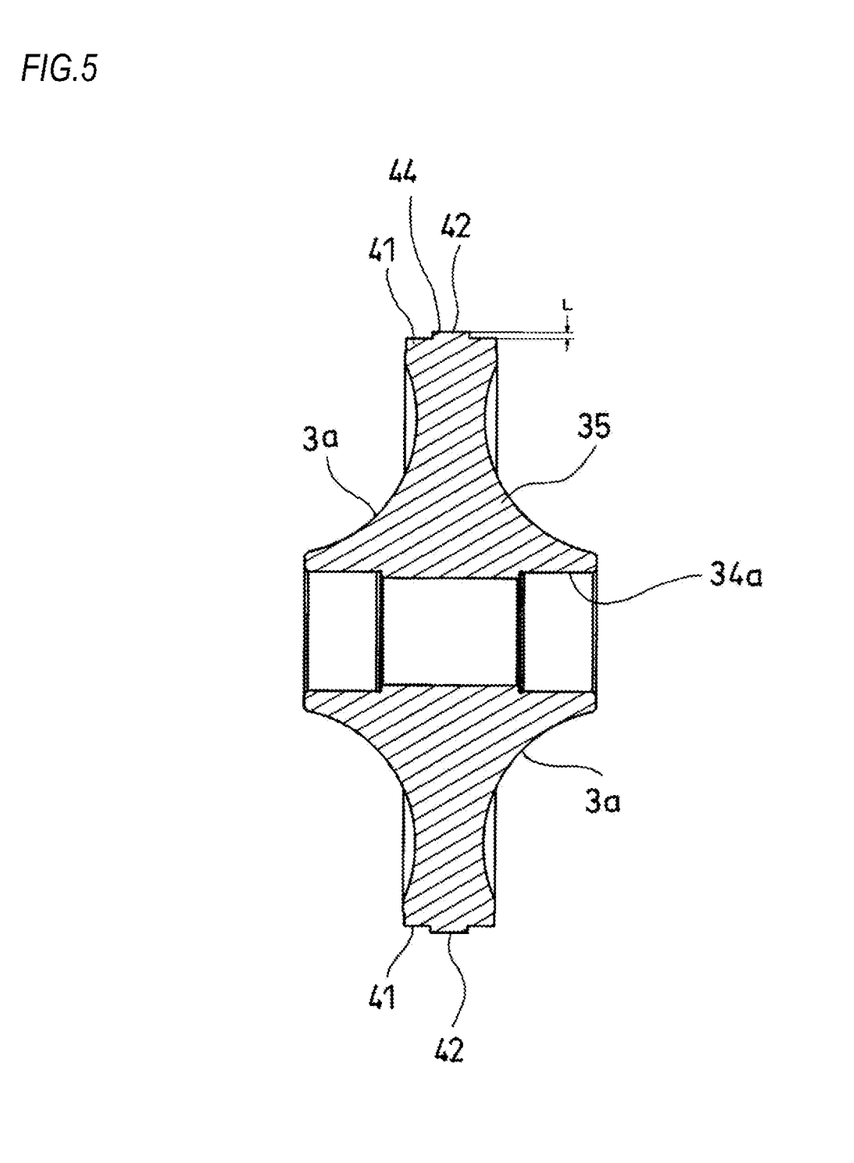
FIG. 5 is a sectional view along line D-D in FIG. 4.

The integrated type output side disk 35 has a helical gear in which the tooth trace direction of the teeth 41 is inclined with respect to the axial direction of the integrated type output side disk 35. FIGS. 4 and 5 are schematic views in which a part of the teeth 41 of the output gear 4 of the integrated type output side disk 35 is simplified. Each circle illustrating a portion of a gear on an outer circumference of the integrated type output side disk 35 in FIG. 4 is a protrusion portion tip end circle (corresponding to a reference plane 44) illustrating a tip end of a protruding portion 42, a teeth tip circle, a reference circle, a base circle, and a teeth bottom circle, from the outside.

The protruding portion 42 is provided substantially in the center portion of the width of each tooth 41 serving as a tooth of the helical gear of the integrated type output side disk 35 in the axial direction of the integrated type output side disk 35. The protruding portion 42 outwardly protrudes substantially in the radial direction of the integrated type output side disk 35 from the tip end surface of the teeth 41 provided with the protruding portion 42.

In each protruding portion 42 which is provided on the tip end surface of each tooth 41, the width (length) in the axial direction of the integrated type output side disk 35 is narrower than the width of the teeth 41 in the axial direction, and it is preferable that the width of each protruding portion 42 in the axial direction be equal to or greater than ⅓ and equal to or less than ⅔ of the teeth 41 in the axial direction, and for example, be approximately half of the width of the teeth 41 in the axial direction. Since the integrated type output side disk 35 is the helical gear, the tooth trace of each tooth 41 is inclined with respect to the axial direction as described above, and each protruding portion 42 provided on the tip end surface of each tooth 41 is also provided in the tooth trace direction of the teeth 41. The length of the protruding portion 42 in the tooth trace direction is shorter than the length of each tooth 41 in the tooth trace direction. Here, for example, the length of each protruding portion 42 provided on each tooth 41 in the tooth trace direction is equal to or greater than ⅓ and equal to or less than ⅔ of the length of the teeth 41 in the tooth trace direction, for example, approximately half of the length of the teeth 41 in the tooth trace direction.

The shape of the teeth 41 of the gear disk which is the integrated type output side disk 35 is not limited to the helical gear, and may be a spur gear or a double helical gear. In this case, it is also preferable that the width of each protruding portion 42 provided on each tooth 41 in the axial direction (or the length along the tooth trace) be equal to or greater than ⅓ and equal to or less than ⅔ of the width of the teeth 41 in the axial direction (or length along the tooth trance), for example, approximately half of the width of the teeth 41 in the axial direction (or the length in the tooth trace).

Further, it is preferable that a distance L from the tip end surface of the teeth 41 to the tip end surface of the protruding portion 42, which is illustrated in FIG. 5, is, for example, approximately 2 mm, but not being limited thereto. Basically, if the integrated type output side disk 35 which serves as the output gear can rotate in a state of being meshed with the other gear, the distance L may be 2 mm or longer, and if the protruding portion 42 protrudes from the tip end surface of the teeth 41, the distance L may be 2 mm or shorter.

The tip end surface of each protruding portion 42 which serves as the reference plane 44 is disposed on one predetermined cylindrical surface. In other words, the reference plane 44 of each protruding portion 42 becomes a part of one predetermined virtual cylindrical surface.

The sectional shape of the protruding portion 42 in the direction orthogonal to the above-described tooth trace has a substantially trapezoidal shape and becomes thinner toward the tip end.

In manufacturing the integrated type output side disk, after performing heat treatment together with the cutting of the gear (forming each tooth 41) on the outer circumferential portion, and at least before traction surface processing which is performed on inner surfaces 3a, 3a of the integrated type output side disk 35, and inner diameter grinding which is performed on a through hole 34a of the integrated type output side disk 35, the reference plane 44 is formed on the outer circumferential portion of the integrated type output side disk 35 for these proces sings.

At this time, in the integrated type output side disk 35 of the present embodiment, since the protruding portion 42 is provided on the outermost circumferential portion, the reference plane 44 is formed, for example, by turning processing and by cutting of the tip end portion of the protruding portion 42.

In this case, while in the conventional technique, the entire length of the teeth 41 of the integrated type output side disk 34 in the tooth trace direction or the entire length (width) in the axial direction of the integrated type output side disk 34 should be cut, in the integrated type output side disk 35 of the present embodiment, it is sufficient that only the length of the protruding portion 42 in the tooth trace direction or the axial direction is cut.

For example, the length of the protruding portion 42 in the tooth trace direction, is for example, approximately ½ of the length of the teeth 41 in the tooth trace direction. Accordingly, for example, a load applied to the tip of the tool bit of a lathe decreases, and in non-continuous processing, the damage of the tip is suppressed and life of tip elongates. Accordingly, it is possible to elongate a replacement cycle of the tip, and to achieve reduction of the cost and working hours related to the replacement of the tip.

Therefore, in the toroidal continuously variable transmission of the present embodiment, the integrated type output side disk 35 is the gear disk which is integrated with the gear by forming the teeth 41 on the outer circumferential portion of the disk 35, each tooth of the outer circumferential portion of the gear disk is provided with the protruding portion 42 which outwardly protrudes in the radial direction of the gear disk and has the width narrower than the width of the teeth 41 in the axial direction of the gear disk, and the tip end surface of the protruding portion 42 serves as a processing reference of the gear disk. According to the configuration, compared to a case where the entire tip end surface (outer circumferential surface) of the teeth serves as a reference plane 43 as illustrated in the conventional technique, the width of a portion to be machined when forming (machining) the reference plane becomes narrow. Accordingly, it is possible to suppress the damage of a cutting edge of a tool, such as a tip which is used when performing the machining, compared to the conventional technique.

The protruding portion 42 (projection) is provided on each tooth 41, and the reference plane 44 is provided by performing the machining on the tip end portion of the protruding portion 42. Even when the width of the machined portion is narrower than the width of the teeth 41, a portion which outwardly protrudes from the reference plane 44 is not present in the tip end portion of the teeth 41. For example, by cutting the tip end portion of the protruding portion 42 on the lathe, it is possible to form the reference plane 44 at a portion which becomes the outermost side of the gear disk.

Further, the width of the protruding portion 42 in the axial direction of the gear disk is equal to or greater than ⅓ and equal to or less than ⅔ of the width of the teeth 41 in the axial direction of the gear disk. In other words, as the width of the protruding portion 42 in the axial direction of the gear disk is equal to or greater than ⅓ of the width of the teeth 41 in the same direction, it is possible to achieve a function as the reference plane 44, and as the width of the protruding portion 42 in the axial direction of the gear disk is equal to or less than ⅔ of the width of the teeth 41 in the same direction, it is possible to suppress the damage of the cutting edge of the tool when performing the machining.

In the above description, the lengths of the teeth 41 and the protruding portion 42 are illustrated in the tooth trace direction and in the axial direction of the integrated type output side disk 3. However, even using any of the lengths, in the same integrated type output side disk, the shape of the teeth 41 or the protruding portion 42 would be same.

Further, in the present embodiment, the gear disk is the integrated type output side disk 35 in which one pair of output side disk 3 and output gear (gear) 4 are formed to be integrated with each other, but for example, it is possible to design the toroidal continuously variable transmission having a structure in which the gear disk in which one pair of input side disks 2 and input gear (gear) are integrated with each other is used, and to employ the present invention in the gear disk.

In addition, it is possible to design the toroidal continuously variable transmission having a structure in which a gear integrated with the output side disk 3 or the input side disk 2 is provided at the outer circumferential part of one output side disk 3 or one input side disk 2, as the gear disk, and to employ the present invention in the gear disk.

INDUSTRIAL APPLICABILITY

The present invention can be applied to a full-toroidal continuously variable transmission in addition to various half-toroidal continuously variable transmissions, such as a single cavity type or a double cavity type.

The present application is based on Japanese Patent Application No. 2014-47454 filed on Mar. 11, 2014, the content of which is incorporated herein by reference.

DESCRIPTION OF REFERENCE NUMERALS

2: Input side disk
3: Output side disk
11: Power roller
35: Integrated type output side disk (gear disk)
41: Teeth
42: Protruding portion
44: Reference plane

The invention claimed is:

1. A toroidal continuously variable transmission comprising:
an input side disk and an output side disk which are provided to be concentric with each other and rotatable, and the input side disk and the output side disk are arranged such that inner side surfaces thereof face each other; and
a power roller which is interposed between the input side disk and the output side disk,
wherein at least one of the input side disk and the output side disk is configured as a gear disk which is integrated with a gear by forming teeth on an outer circumferential portion of the gear disk,
wherein each tooth on the outer circumferential portion of the gear disk is provided with a protruding portion which outwardly protrudes in a radial direction of the gear disk and has a width narrower than a width of the teeth in an axial direction of the gear disk, and a tip end surface of the protruding portion serves as a processing reference of the gear disk,
wherein the tip end surface of each protruding portion in the radial direction which serves as the processing reference is a part of a cylindrical surface,
wherein a distance from a tip end surface of each tooth of the gear disk to the tip end surface of each protruding portion in the radial direction is greater than 0 mm and less than 2 mm, and
wherein each tooth and the protruding portion provided therewith are monolithically formed.

* * * * *